: 2,805,127

STABILIZATION OF LIQUID SULFUR TRIOXIDE AGAINST POLYMERIZATION

James R. Jones, Tonawanda, N. Y., assignor to Olin Mathieson Chemical Corporation, a corporation of Virginia No Drawing. Application April 10, 1956, Serial No. 577,202

6 Claims. (Cl. 23—174)

This invention relates to the stabilization of substantially pure liquid sulfur trioxide against polymerization to high melting forms.

On standing at room temperature, probably due to the presence of traces of moisture, liquid sulfur trioxide will polymerize to various forms which melt at about 17° C., 33° C. and 62° C. The mass becomes solid and may require temperatures of up to 100° C. to completely reliquefy it.

This property of $SO_3$ creates disadvantages in its shipping, storage and use. While these disadvantages may be overcome by, for example, the use of containers equipped with heating elements, this would incur considerable expense. Reliquefaction at elevated temperatures would also demand special containers capable of withstanding the high pressures of $SO_3$ at the higher temperatures.

It is the object of this invention to provide chemical stabilizers for liquid $SO_3$ which will prevent polymerization to the high melting (60°–100° C.) alpha form. I have found that certain inorganic nitrosyl compounds, when added to sulfur trioxide, will accomplish this objective.

According to this invention, a salt of the formula $NO^+X^-$ is added to the sulfur trioxide to achieve stabilization, wherein X is an acid, including oxy acid, radical of an element in groups Vb, VIb and VIIb of the periodic classification with atomic weights between 17 and 130, i.e. wherein X is an acid, including oxy acid, radical of an element selected from the group consisting of phosphorus, arsenic, antimony, sulfur, selenium, tellurium, fluorine, chlorine, bromine and iodine. Examples of suitable compounds are nitrosyl fluoride, nitrosyl chloride, nitrosyl bromide, nitrosyl fluophosphate, nitrosyl bisulfate, nitrosyl fluosulphonate, nitrosyl selenate and nitrosyl perchlorate.

These compounds can be prepared by known methods described in the literature, for example, by the action of nitric oxide and nitrogen dioxide on the acid corresponding to the anion desired: viz.

$$NO + NO_2 + 2H_2SO_4 \rightarrow 2NOHSO_4 + H_2O$$

The compounds can be added in amounts up to 3 weight percent, although between 0.1 percent and 2 percent by weight is preferred.

The following examples illustrate this invention without placing any limitations thereon.

Example I

Two samples of liquid sulfur trioxide containing 1.03 weight percent and 1.96 weight percent of nitrosyl bisulfate, respectively, were prepared for testing. After freezing both samples for about one hour, neither sample melting in a 17° C. water bath but was completely polymerized. However, instead of polymerizing to the alpha form (M. P. 62° C.), these samples did melt at 34° C. showing that they polymerized only to the beta form (M. P. 32° C.).

Example II 0.15 gram of nitrosyl perchlorate and 48.64 grams of liquid sulfur trioxide were prepared in an air-tight flask. The contents of the flask were then frozen for one hour at 0° C., following which the contents were permitted to warm to 17–20° C. At that time, approximately 75 percent by weight of the contents of the flask had melted. The contents of the flask were then again frozen for 15 hours at 0° C. Upon heating to 32–34° C., the mixture of nitrosyl perchlorate and sulfur trioxide liquefied completely.

I claim:

1. Liquid sulfur trioxide which has been stabilized against solidification to the alpha-form by the incorporation therein of a small percentage of an inorganic salt of the formula $NO^+X^-$ wherein X is an acid radical of an element selected from the group consisting of phosphorus, arsenic, antimony, sulfur, selenium, tellurium, fluorine, chlorine, bromine and iodine.

2. The product of claim 1 wherein the weight amount of $NO^+X^-$ incorporated into the $SO_3$ is within the range from 0.1 to 3 percent.

3. The product of claim 1 wherein $NO^+X^-$ is nitrosyl bisulfate.

4. The product of claim 1 wherein $NO^+X^-$ is nitrosyl perchlorate.

5. Liquid sulfur trioxide which has been stabilized against solidification to the alpha-form by the incorporation therein of from 0.1 to 3 weight percent of nitrosyl bisulfate.

6. Liquid sulfur trioxide which has been stabilized against solidification to the alpha-form by the incorporation therein of from 0.1 to 3 weight percent of nitrosyl perchlorate.

References Cited in the file of this patent

Mellor: "Comprehensive Treatise on Inorganic and Theoretical Chemistry," vol. 10, page 345.